US010942036B2

(12) United States Patent
Mizutani et al.

(10) Patent No.: US 10,942,036 B2
(45) Date of Patent: Mar. 9, 2021

(54) INFORMATION PROVIDING SYSTEM, SERVER, AND INFORMATION PROVIDING METHOD

(71) Applicant: TOYOTA JIDOSHA KABUSHIKI KAISHA, Toyota (JP)

(72) Inventors: Atsushi Mizutani, Toyota (JP); Daiki Kaneichi, Nisshin (JP); Hirotaka Karube, Toyota (JP); Jun Kondo, Nisshin (JP); Kenichi Komuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 16/174,836

(22) Filed: Oct. 30, 2018

(65) Prior Publication Data

US 2019/0128684 A1    May 2, 2019

(30) Foreign Application Priority Data

Nov. 1, 2017 (JP) .............................. JP2017-212085

(51) Int. Cl.
*G01C 21/34* (2006.01)
*G07C 5/00* (2006.01)
(Continued)

(52) U.S. Cl.
CPC .......... *G01C 21/3438* (2013.01); *B60L 50/00* (2019.02); *G01C 21/3676* (2013.01);
(Continued)

(58) Field of Classification Search
None
See application file for complete search history.

(56) References Cited

U.S. PATENT DOCUMENTS

2011/0025267 A1\* 2/2011 Kamen ................... B60L 55/00
320/109
2012/0271758 A1\* 10/2012 Jammer .................. B60L 50/66
705/39
(Continued)

FOREIGN PATENT DOCUMENTS

JP        2012128587 A      7/2012
JP        2012-207941 A     10/2012
(Continued)

OTHER PUBLICATIONS

United States Patent and Trademark Office, Final Office Action issued to U.S. Appl. No. 16/174,473 dated Jul. 10, 2020, 22 pages.
(Continued)

*Primary Examiner* — Tamara L Weber
(74) *Attorney, Agent, or Firm* — Hunton Andrews Kurth LLP

(57) ABSTRACT

An information providing system includes: a power-supplying vehicle; a plurality of power-receiving vehicles; and a server. The server is configured to generate a candidate power-supplying target list including information of the plurality of power-receiving requesting vehicles, and notify the candidate power-supplying target list to the power-supplying vehicle so as to make an inquiry to a user of the power-supplying vehicle to select any of the plurality of power-receiving requesting vehicle. The power-supplying vehicle having received this inquiry is configured to present locations of candidate power-supplying targets on a map screen and make a response to the server by notifying, to the server, a power-supplying target selected by the user. The server having received this response matches the power-supplying target notified from the power-supplying vehicle to the power-supplying vehicle, and notifies matching determination information to both the matched vehicles.

6 Claims, 10 Drawing Sheets

(51) Int. Cl.
   *G01C 21/36* (2006.01)
   *B60L 50/00* (2019.01)
   *H04W 4/44* (2018.01)
   *G08G 1/13* (2006.01)

(52) U.S. Cl.
   CPC ......... *G01C 21/3697* (2013.01); *G07C 5/008*
         (2013.01); *G08G 1/13* (2013.01); *H04W 4/44*
                                                    (2018.02)

(56) References Cited

U.S. PATENT DOCUMENTS

| | | | |
|---|---|---|---|
| 2013/0035823 A1 | 2/2013 | Yoshida | |
| 2013/0204471 A1* | 8/2013 | O'Connell | B60L 53/30 701/22 |
| 2014/0188318 A1* | 7/2014 | Langgood | B60L 58/12 701/22 |
| 2014/0278104 A1* | 9/2014 | Proietty | G01C 21/3438 701/537 |
| 2018/0265293 A1 | 9/2018 | Zuckerman et al. | |
| 2019/0135133 A1 | 5/2019 | Miller | |
| 2019/0351783 A1 | 11/2019 | Goei | |
| 2019/0375306 A1 | 12/2019 | Ambrosetti | |

FOREIGN PATENT DOCUMENTS

| | | |
|---|---|---|
| JP | 2013115873 A | 6/2013 |
| JP | 2013130963 A | 7/2013 |
| JP | 2013-192285 A | 9/2013 |
| KR | 20170034477 A | 3/2017 |

OTHER PUBLICATIONS

United States Patent and Trademark Office, Non-Final Office Action issued to U.S. Appl. No. 16/174,473 dated Jan. 3, 2020, 20 pages.
United States Patent and Trademark Office, Non-Final Office Action issued to U.S. Appl. No. 16/174,473 dated Oct. 29, 2020, 23 pages.

* cited by examiner

FIG.8

CANDIDATE POWER-SUPPLYING TARGET LIST

| CANDIDATE POWER-SUPPLYING TARGET | VEHICLE LOCATION | REQUESTED POWER-RECEIVING AMOUNT | CHARGING TIME | GATHERING LOCATION |
|---|---|---|---|---|
| POWER-RECEIVING REQUESTING VEHICLE A | Pa | Ea | Ta | PPa |
| POWER-RECEIVING REQUESTING VEHICLE B | Pb | Eb | Tb | PPb |
| POWER-RECEIVING REQUESTING VEHICLE C | Pc | Ec | Tc | PPc |

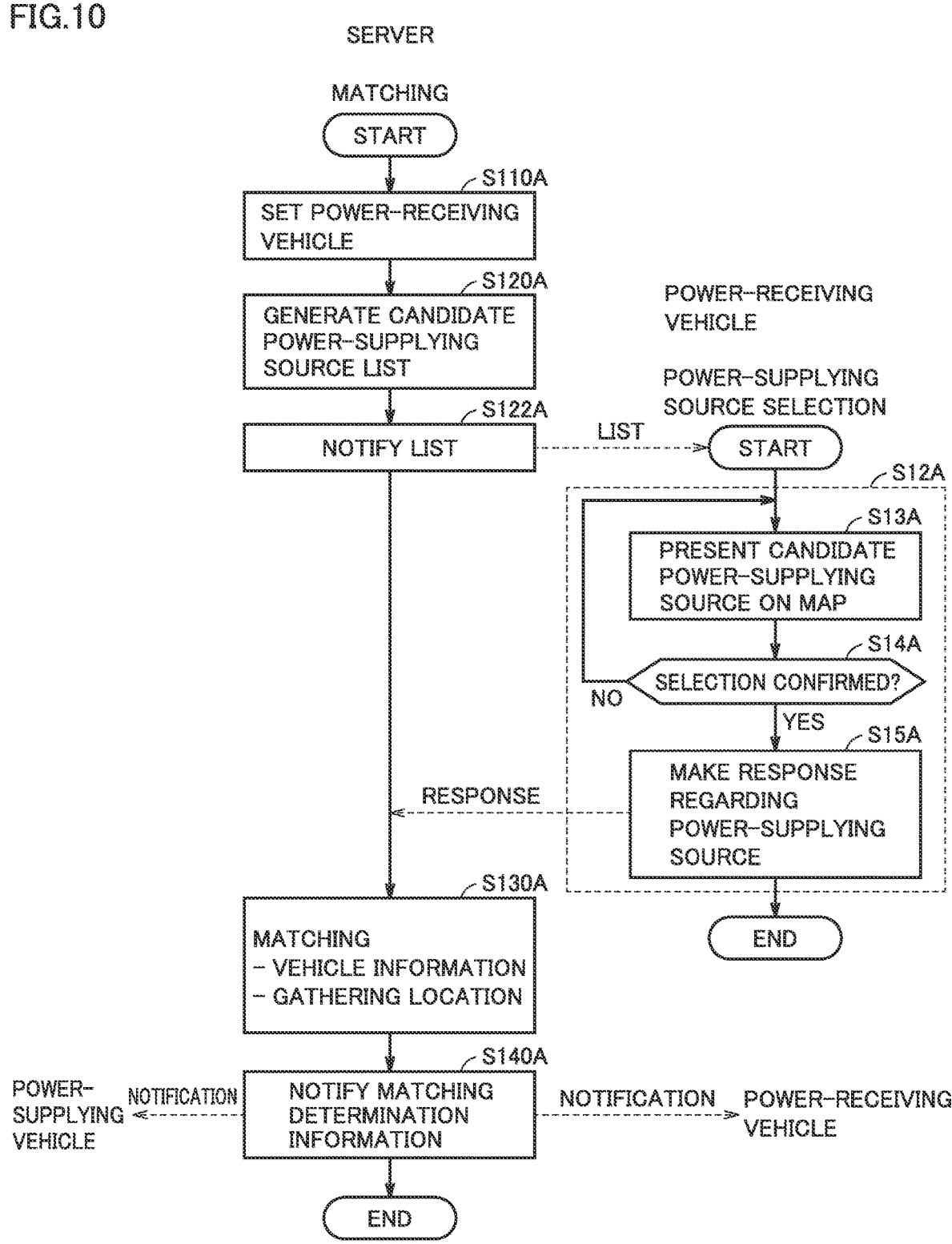

INFORMATION PROVIDING SYSTEM, SERVER, AND INFORMATION PROVIDING METHOD

This nonprovisional application is based on Japanese Patent Application No. 2017-212085 filed on Nov. 1, 2017, with the Japan Patent Office, the entire contents of which are hereby incorporated by reference.

BACKGROUND

Field

The present disclosure relates to system, server, and method for providing information to an electrically powered vehicle.

Description of the Background Art

Japanese Patent Laying-Open No. 2013-192285 discloses a system that facilitates an electrically powered vehicle, which requests to receive power, to perform a power-supplying negotiation with another vehicle. This system includes a plurality of electrically powered vehicles each configured to exchange power with another vehicle. Among the plurality of electrically powered vehicles, a power-receiving requesting vehicle makes a request for supply of power thereto by simultaneously notifying the current location of the power-receiving requesting vehicle to an unspecified number of other vehicles around the power-receiving requesting vehicle. This makes it possible for a user of the power-receiving requesting vehicle to save time and effort in performing power-supplying negotiations with users of the other vehicles one after another.

SUMMARY

However, in the system disclosed in Japanese Patent Laying-Open No. 2013-192285, a user of a power-supplying vehicle is unable to know what option a power-receiving vehicle to serve as a power-supplying target has. Likewise, a user of a power-receiving vehicle is unable to know what option a power-supplying vehicle to serve as a power-supplying source has.

The present disclosure has been made to solve the above-described problem, and has an object to allow a user of a power-supplying vehicle to know what option a power-receiving vehicle to serve as a power-supplying target has. Moreover, another object thereof is to allow a user of a power-receiving vehicle to know what option a power-supplying vehicle to serve as a power-supplying source has.

(1) An information providing system according to the present disclosure includes: a power-supplying vehicle; a plurality of power-receiving vehicles; and a server configured to communicate with the power-supplying vehicle and the plurality of power-receiving vehicles. The server is configured to: notify candidate information including information of the plurality of power-receiving vehicles to the power-supplying vehicle so as to make an inquiry to the power-supplying vehicle to select any (one or more) of the plurality of power-receiving vehicles; and match the power-supplying vehicle and a power-receiving vehicle selected by the power-supplying vehicle, and transmit, to the power-supplying vehicle and the selected power-receiving vehicle, information indicating that the power-supplying vehicle and the selected power-receiving vehicle are matched.

According to the above-described configuration, the candidate information including the information of the plurality of power-receiving vehicles is notified to the power-supplying vehicle. Accordingly, the user of the power-supplying vehicle can know what option a power-receiving vehicle to serve as a power-supplying target has, and then can select a desired power-supplying target.

(2) In a certain embodiment, the server is configured to set a plurality of respective gathering locations corresponding to the plurality of power-receiving vehicles using a location of the power-supplying vehicle and locations of the plurality of power-receiving vehicles. The candidate information includes information of the locations of the plurality of power-receiving vehicles and the plurality of set gathering locations.

According to the above-described configuration, the information of the locations of the plurality of power-receiving vehicles and the plurality of respective gathering locations corresponding to the plurality of power-receiving vehicles is notified to the power-supplying vehicle. Accordingly, the user of the power-supplying vehicle can check the location of a power-receiving vehicle to serve as a power-supplying target and the gathering location for the power-receiving vehicle, and then can select a desired power-supplying target.

(3) In a certain embodiment, the power-supplying vehicle includes: a display configured to present a map screen; and a controller configured to control the display. The controller is configured to present, on the map screen of the display, the locations of the plurality of power-receiving vehicles included in the candidate information received from the server. The controller is configured to present, when a user performs an operation of selecting any of the plurality of power-receiving vehicles presented on the map screen of the display, on the map screen of the display, a gathering location corresponding to the power-receiving vehicle selected by the user.

According to the above-described configuration, the locations of the plurality of power-receiving vehicles are presented on the map screen in the power-supplying vehicle. Accordingly, the user of the power-supplying vehicle can intuitively know the location of each candidate power-supplying target. Further, in the power-supplying vehicle, the gathering location corresponding to the power-receiving vehicle selected by the user is presented on the map screen of the display. Accordingly, the user of the power-supplying vehicle can intuitively know the gathering location for the power-supplying target selected by the user of the power-supplying vehicle.

(4) A server according to the present disclosure includes: a communication device configured to communicate with a power-supplying vehicle and a plurality of power-receiving vehicles; and a controller connected to the communication device. The controller is configured to: notify, to the power-supplying vehicle, candidate information including information of the plurality of power-receiving vehicles so as to make an inquiry to the power-supplying vehicle to select any of the plurality of power-receiving vehicles; and match the power-supplying vehicle and a power-receiving vehicle selected by the power-supplying vehicle and transmit, to the power-supplying vehicle and the selected power-receiving vehicle, information indicating that the power-supplying vehicle and the selected power-receiving vehicle are matched.

(5) An information providing method according to the present disclosure is an information providing method performed by an information providing system, the information providing system including: a power-supplying vehicle; a plurality of power-receiving vehicles; and a server configured to communicate with the power-supplying vehicle and the plurality of power-receiving vehicles. This information providing method includes: generating candidate information including information of the plurality of power-receiving vehicles; notifying the candidate information to the power-supplying vehicle so as to make an inquiry to the power-supplying vehicle to select any of the plurality of power-receiving vehicles; matching the power-supplying vehicle and a power-receiving vehicle selected by the power-supplying vehicle and transmitting, to the power-supplying vehicle and the selected power-receiving vehicle, information indicating that the power-supplying vehicle and the selected power-receiving vehicle are matched.

According to the server recited in (4) or the information providing method recited in (5), the candidate information including the information of the plurality of power-receiving vehicles is notified to the power-supplying vehicle. Accordingly, the user of the power-supplying vehicle can know what option a power-receiving vehicle to serve as a power-supplying target has, and then can select a desired power-supplying target.

(6) An information providing system according to the present disclosure includes: a power-receiving vehicle; a plurality of power-supplying vehicles; and a server configured to communicate with the power-receiving vehicle and the plurality of power-supplying vehicles. The server is configured to: notify, to the power-receiving vehicle, candidate information including information of the plurality of power-supplying vehicles so as to make an inquiry to the power-receiving vehicle to select any of the plurality of power-supplying vehicles; and match the power-receiving vehicle and a power-supplying vehicle selected by the power-receiving vehicle and transmit, to the power-receiving vehicle and the selected power-supplying vehicle, information indicating that the power-receiving vehicle and the selected power-supplying vehicle are matched.

According to the above-described configuration, the candidate information including the information of the plurality of power-supplying vehicles is notified to the power-receiving vehicle. Accordingly, the user of the power-receiving vehicle can know what option a power-supplying vehicle to serve as a power-supplying source has, and then can select a desired power-supplying source.

(7) In a certain embodiment, the server is configured to set a plurality of respective gathering locations corresponding to the plurality of power-supplying vehicles using a location of the power-receiving vehicle and locations of the plurality of power-supplying vehicles. The candidate information includes information of the locations of the plurality of power-supplying vehicles and the plurality of set gathering locations.

According to the above-described configuration, the information of the locations of the plurality of power-supplying vehicles and the plurality of respective gathering locations corresponding to the plurality of power-supplying vehicles is notified to the power-receiving vehicle. Accordingly, the user of the power-receiving vehicle can check the location of a power-supplying vehicle to serve as a power-receiving target and the gathering location for the power-supplying vehicle, and then can select a desired power-receiving target.

(8) In a certain embodiment, the power-receiving vehicle includes: a display configured to present a map screen; and a controller configured to control the display. The controller is configured to present, on the map screen of the display, locations of the plurality of power-supplying vehicles included in the candidate information received from the server. The controller is configured to present, when a user performs an operation of selecting any of the plurality of power-supplying vehicles presented on the map screen of the display, on the map screen of the display, a gathering location corresponding to the power-supplying vehicle selected by the user.

According to the above-described configuration, in the power-receiving vehicle, the locations of the plurality of power-supplying vehicles are presented on the map screen. Accordingly, the user of the power-receiving vehicle can intuitively know the location of each candidate power-supplying source. Furthermore, in the power-receiving vehicle, the gathering location corresponding to the power-supplying vehicle selected by the user is presented on the map screen of the display. Accordingly, the user of the power-receiving vehicle can intuitively know the gathering location with the power-supplying source selected by the user of the power-receiving vehicle.

(9) A server according to the present disclosure includes: a communication device configured to communicate with a power-receiving vehicle and a plurality of power-supplying vehicles; and a controller connected to the communication device. The controller is configured to: notify, to the power-receiving vehicle, candidate information including information of the plurality of power-supplying vehicles so as to make an inquiry to the power-receiving vehicle to select any of the plurality of power-supplying vehicles; and match the power-receiving vehicle and a power-supplying vehicle selected by the power-receiving vehicle and transmit, to the power-receiving vehicle and the selected power-supplying vehicle, information indicating that the power-receiving vehicle and the selected power-supplying vehicle are matched.

(10) An information providing method according to the present disclosure is an information providing method performed by an information providing system, the information providing system including: a power-receiving vehicle; a plurality of power-supplying vehicles; and a server configured to communicate with the power-receiving vehicle and the plurality of power-supplying vehicles. The information providing method includes: notifying, to the power-receiving vehicle, candidate information including information of the plurality of power-supplying vehicles so as to make an inquiry to the power-receiving vehicle to select any of the plurality of power-supplying vehicles; and matching the power-receiving vehicle and a power-supplying vehicle selected by the power-receiving vehicle and transmitting, to the power-receiving vehicle and the selected power-supplying vehicle, information indicating that the power-receiving vehicle and the selected power-supplying vehicle are matched.

According to the server recited in (9) or the information providing method recited in (10), the candidate information including the information of the plurality of power-supplying vehicles is notified to the power-receiving vehicle. Accordingly, the user of the power-receiving vehicle can know what option a power-supplying vehicle to serve as a power-supplying source has, and then can select a desired power-supplying source.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 shows an exemplary candidate power-supplying target list generated by the server.

FIG. 10 is a flowchart showing an exemplary detailed procedure of each of a matching process performed by the server and a power-supplying source selection process performed by the power-receiving vehicle.

DESCRIPTION OF THE PREFERRED EMBODIMENTS

Figure 1:
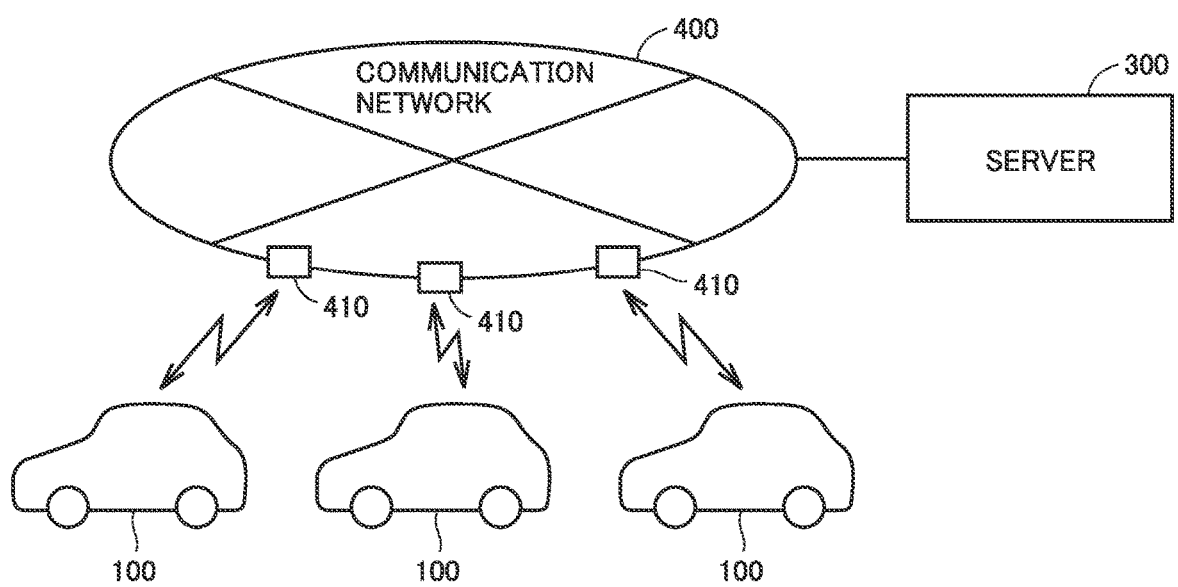
FIG. 1 schematically shows an entire configuration of an information providing system.

The following describes embodiments of the present disclosure with reference to figures in detail. It should be noted that the same or corresponding portions are given the same reference characters and are not described repeatedly.

<System Configuration>

FIG. 1 schematically shows an entire configuration of an information providing system 10 according to the present embodiment. Information providing system 10 includes a plurality of electrically powered vehicles (hereinafter, also simply referred to as "vehicles") 100, and a server 300. Each vehicle 100 and server 300 are configured to communicate with each other via a communication network 400 such as the Internet or a telephone network. It should be noted that each vehicle 100 is configured to send and receive information to and from a base station 410 of communication network 400 through wireless communication.

As described below with reference to FIG. 2, vehicle 100 is an electric vehicle (EV) configured to generate driving power for traveling using electric power from a power storage device mounted thereon and to permit charging of the power storage device using electric power supplied from a power supply external to the vehicle.

Server 300 communicates with vehicle 100 and provides vehicle 100 with information about other vehicles.

Figure 2:
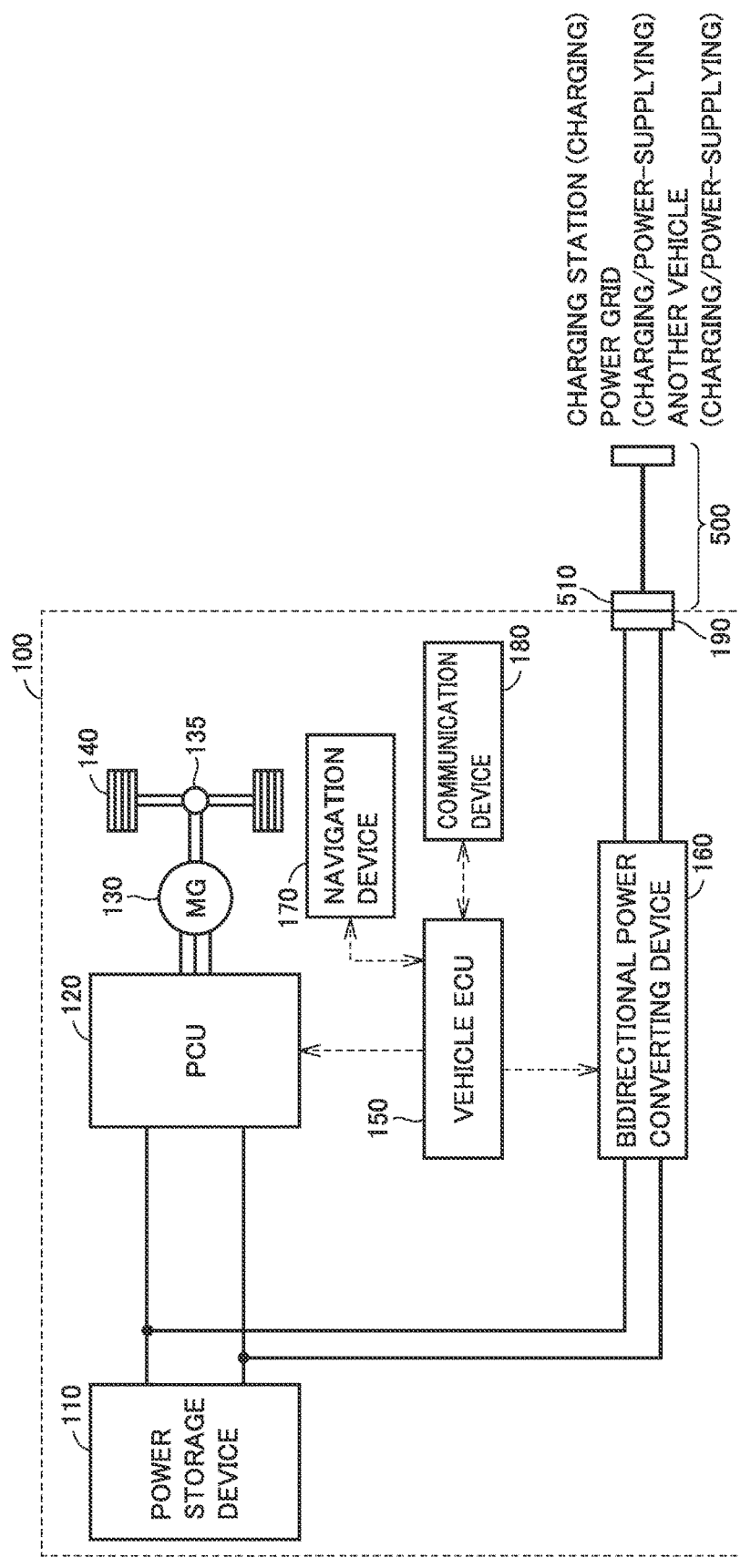
FIG. 2 shows an exemplary configuration of a vehicle.

FIG. 2 shows an exemplary configuration of vehicle 100. Vehicle 100 includes a power storage device 110, a PCU 120 serving as a driving device, a motor generator 130, a power transmitting gear 135, driving wheels 140, a vehicle ECU (Electronic Control Unit) 150, and a navigation device 170.

In vehicle 100, power storage device 110 can be charged using power supplied from a charging station or commercial power grid external to the vehicle. Moreover, vehicle 100 can output power of power storage device 110 to outside the vehicle, and can perform "inter-vehicle charging", which is charging and discharging between vehicle 100 and another vehicle.

Figure 3:
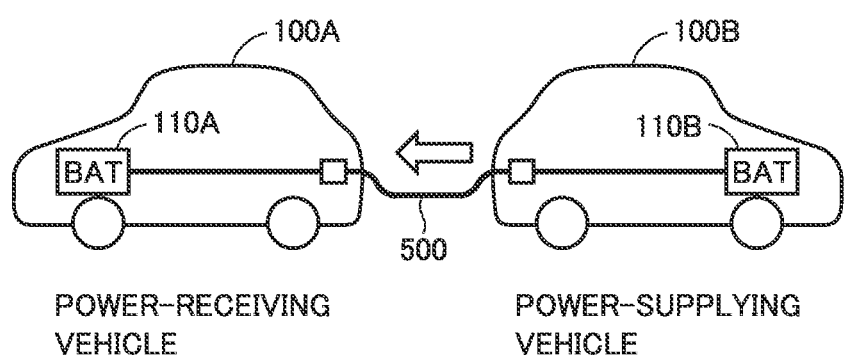
FIG. 3 illustrates inter-vehicle charging.

FIG. 3 illustrates the inter-vehicle charging. For the inter-vehicle charging, as shown in FIG. 3, a vehicle 100 (hereinafter, also referred to as "power-receiving vehicle 100A") to receive power and a vehicle 100 (hereinafter, also referred to as "power-supplying vehicle 100B") to supply power are connected to each other via a charging cable 500. Then, power is discharged from a power storage device 110B of power-supplying vehicle 100B to charge a power storage device 110A of power-receiving vehicle 100A.

Turning back to FIG. 2, power storage device 110 is configured to be charged and discharged. Power storage device 110 is configured to include a secondary battery such as a lithium ion battery or a nickel-hydrogen battery, or include a power storage element such as an electric double layer capacitor, for example.

Power storage device 110 supplies electric power to PCU 120 so as to generate driving power of vehicle 100. Further, power storage device 110 stores electric power generated by motor generator 130. Power storage device 110 outputs, to vehicle ECU 150, detection values of voltage and current of power storage device 110 detected by a sensor not shown in the figure.

PCU 120 is configured to include power converting devices such as a converter and an inverter, which are not shown in the figure. Each of the converter and the inverter is controlled by a control signal from vehicle ECU 150 to convert DC power from power storage device 110 into AC power for driving motor generator 130.

Motor generator 130 is an alternating-current rotating electrical machine, such as a permanent-magnet type synchronous motor including a rotor having a permanent magnet embedded therein. Output torque of motor generator 130 is transmitted to driving wheels 140 via power transmitting gear 135 to travel vehicle 100. Motor generator 130 is capable of generating electric power using rotation power of driving wheels 140 when vehicle 100 operates for regenerative braking. The electric power thus generated is converted by PCU 120 into charging power for power storage device 110.

Although not shown in FIG. 2, vehicle ECU 150 includes a CPU (Central Processing Unit), a storage device, and an input/output buffer, so as to receive signals from sensors, send control signals to devices, and control vehicle 100 and the devices. It should be noted that they can be controlled by not only a process performed by software but also a process performed by dedicated hardware (electronic circuit) constructed therefor.

As a configuration for charging and discharging power storage device 110, vehicle 100 further includes a bidirectional power converting device 160, a communication device 180, and an inlet 190. A charging connector 510 of charging cable 500 is connected to inlet 190. Via charging cable 500, power supplied from another vehicle is transferred to vehicle 100.

Bidirectional power converting device 160 is connected between power storage device 110 and inlet 190. Bidirectional power converting device 160 is controlled by a control signal from vehicle ECU 150 to convert power supplied from another vehicle or the like into power with which power storage device 110 can be charged. Moreover, bidirectional power converting device 160 converts power from power storage device 110 into power that can be output to outside the vehicle.

Communication device 180 is an interface for communication between vehicle ECU 150 and server 300 external to the vehicle or another vehicle. As described above, communication device 180 is configured to communicate with server 300 via communication network 400.

Figure 4:
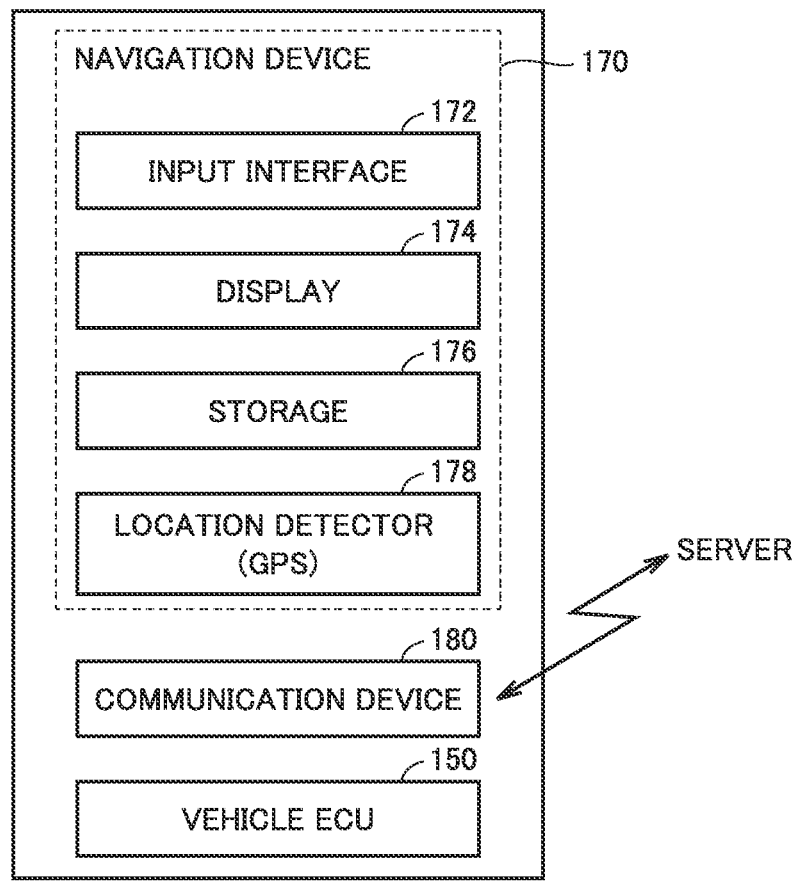
FIG. 4 is a block diagram showing a configuration in relation with a navigation device in the vehicle.

FIG. 4 is a block diagram showing a configuration in relation with navigation device 170 in vehicle 100. Navigation device 170 includes an input interface 172, a display 174, a storage 176, and a location detector 178 as shown in FIG. 4. Navigation device 170 uses map information stored in storage 176 and location information of vehicle 100 detected by GPS (Global Positioning System) of location detector 178, so as to present the current location of vehicle 100 on a map for the user and provide a navigation to a destination.

Display 174 is constructed of, for example, a liquid crystal panel and presents the current location of vehicle 100 or various information from vehicle ECU 150. Input interface 172 is constructed of a touch panel, a switch, or the like, and receives an operation by the user.

Figure 5:
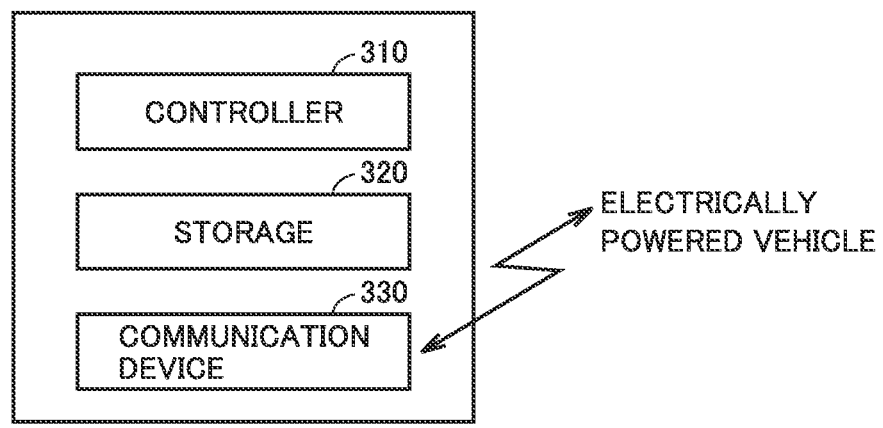
FIG. 5 is a block diagram showing a configuration of a server.

FIG. 5 is a block diagram showing a configuration of server 300. Server 300 includes a controller 310, a storage 320, and a communication device 330.

Communication device 330 is an interface for communication with vehicle 100 via communication network 400. In storage 320, the map information and the information (location information or the like) received from vehicle 100 are stored.

Based on the information received from vehicle 100 by communication device 330 and the information stored in storage 320, controller 310 performs a matching process for vehicles that are to perform inter-vehicle charging as described below.

<Matching of Vehicles that are to Perform Inter-Vehicle Charging>

As described above, vehicle 100 can perform inter-vehicle charging, which is charging and discharging between vehicle 100 and another vehicle. Therefore, when a vehicle 100 (hereinafter, also referred to as "power-receiving requesting vehicle") having a power storage device 110 with a small remaining power amount and requesting reception of power from another vehicle can be matched to a vehicle 100 (hereinafter, also referred to as "power-supplying permitted vehicle") having a power storage device 110 with a large remaining power amount and permitted to supply power to another vehicle, electric energy stored in each vehicle 100 can be utilized effectively.

However, the user of the power-supplying permitted vehicle is unable to know what option a power-receiving vehicle to serve as a power-supplying target has. In view of this point, information providing system 10 according to the first embodiment provides a service that allows a user of a power-supplying permitted vehicle to intuitively know what option a power-supplying target has and to select a power-supplying target when matching the power-supplying permitted vehicle and a power-receiving requesting vehicle. Hereinafter, details of this service will be described.

Figure 6:
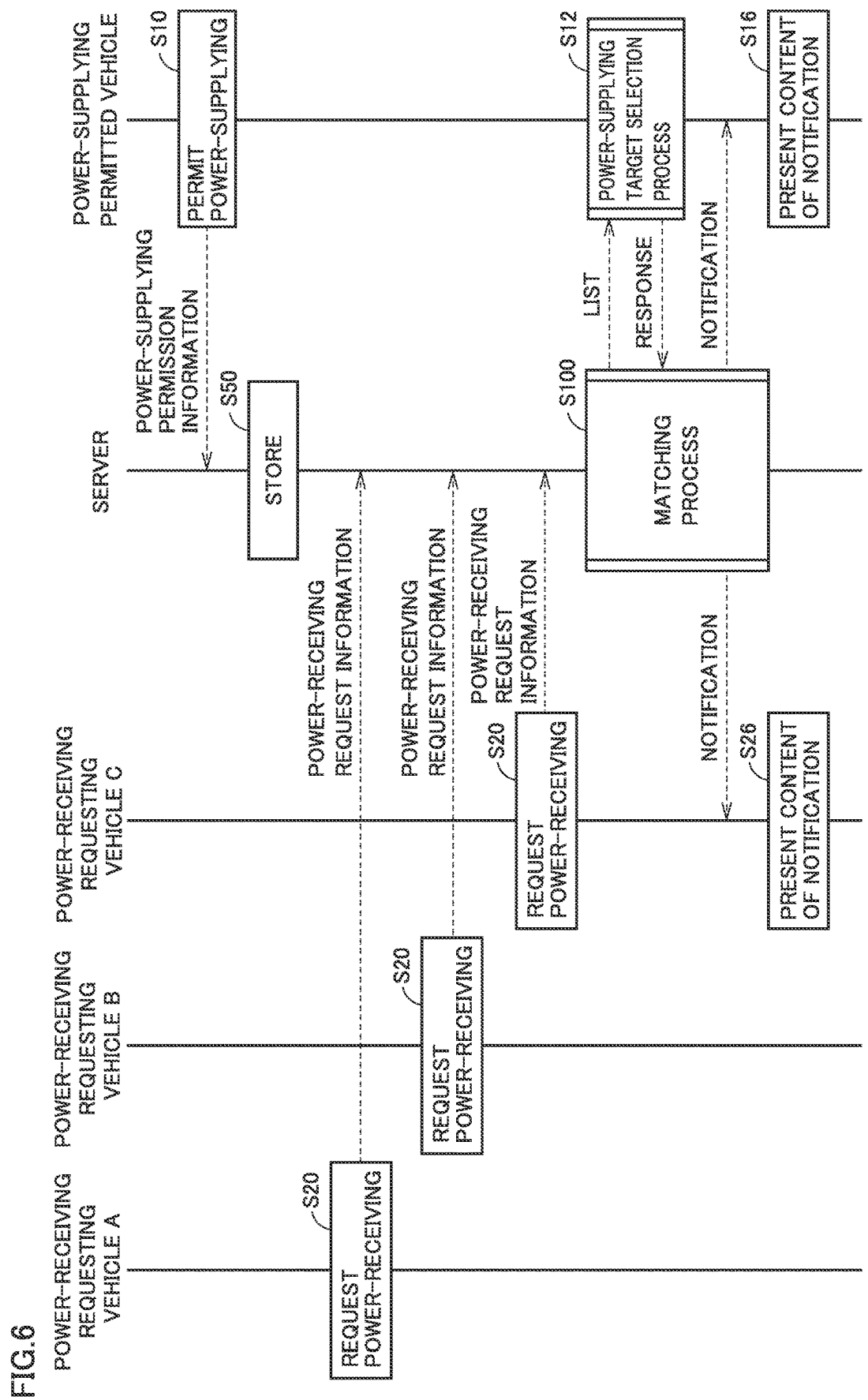
FIG. 6 is a sequence diagram showing an exemplary process performed among a power-receiving requesting vehicle, a server, and a power-supplying permitted vehicle included in the information providing system.

FIG. 6 is a sequence diagram showing an exemplary process among power-receiving requesting vehicles (more specifically, vehicle ECUs 150 of the power-receiving requesting vehicles), server 300 (more specifically, controller 310 of server 300), and a power-supplying permitted vehicle (more specifically, vehicle ECU 150 of the power-supplying permitted vehicle) included in information providing system 10. It should be noted that for simplification of explanation, FIG. 6 illustrates an example in which three power-receiving requesting vehicles A to C and one power-supplying permitted vehicle communicate with server 300.

When it is permitted in the power-supplying permitted vehicle to supply power to another vehicle, the power-supplying permitted vehicle transmits power-supplying permission information to server 300 (step S10). The power-supplying permission information includes information such as a vehicle ID for specifying the power-supplying permitted vehicle, a current location of the power-supplying permitted vehicle, and a power amount (hereinafter, also referred to as "possible power-supplying amount") that can be supplied to another vehicle.

When the power-supplying permission information is received from the power-supplying permitted vehicle, server 300 stores, into storage 320, the power-supplying permission information received from the power-supplying permitted vehicle (step S50).

In order to request to receive power from another vehicle, power-receiving requesting vehicle A transmits power-receiving request information of power-receiving requesting vehicle A to server 300 (step S20). The power-receiving request information includes information such as a vehicle ID for specifying power-receiving requesting vehicle A, a current location of the power-receiving requesting vehicle, and a power amount (hereinafter, also referred to as "requested power-receiving amount") requested to be received from another vehicle. Likewise, in order to request to receive power from another vehicle, power-receiving requesting vehicle B transmits power-receiving request information of power-receiving requesting vehicle B to server 300 (step S20). The same applies to power-receiving requesting vehicle C (step S20).

When the respective pieces of the power receiving request information are received from power-receiving requesting vehicles A to C during a period of predetermined time from reception of the power-supplying permission information from the power-supplying permitted vehicle, server 300 sets the power-supplying permitted vehicle as a "power-supplying vehicle", sets power-receiving requesting vehicles A to C as "candidate power-supplying targets" for the power-supplying vehicle, and performs a process for matching the power-supplying vehicle and one of the three candidate power-supplying targets (hereinafter, also simply referred to as "matching process") (step S100).

In the matching process, server 300 sets a plurality of respective gathering locations corresponding to power-receiving requesting vehicles A to C using the location information of the power-supplying vehicle and the respective pieces of location information of power-receiving requesting vehicles A to C, and generates a "candidate power-supplying target list" including information of the locations of power-receiving requesting vehicles A to C and the gathering locations. Then, server 300 transmits the generated candidate power-supplying target list to the power-supplying vehicle so as to make an inquiry to the user of the power-supplying vehicle to select one of power-receiving requesting vehicles A to C included in the candidate power-supplying target list.

The power-supplying vehicle having received this inquiry presents, on display 174, the candidate power-supplying target list received from server 300, allows the user to select one of the candidate power-supplying targets (power-receiving requesting vehicles A to C) included in the candidate power-supplying target list, and makes a response to server 300 by notifying thereto information indicating a power-supplying target selected by the user (step S12). Hereinafter, the process of this step S12 will be also referred to as "power-supplying target selection process".

Server 300 sets, as the "power-receiving vehicle", the power-supplying target (power-receiving requesting vehicle C in the example shown in FIG. 6) notified from the power-supplying vehicle, and matches the set power-receiving vehicle to the power-supplying vehicle. Then, server 300 notifies, to each of the matched vehicles (the power-supplying vehicle and the power-receiving vehicle), matching determination information including information of the matched vehicles and the gathering location.

The power-supplying vehicle having received the matching determination information from server 300 presents the received content on display 174 (step S16). Likewise, the power-receiving vehicle having received the matching determination information from server 300 (power-receiving requesting vehicle C in the example shown in FIG. 6) presents the received content on display 174 (step S26). Accordingly, the user of each vehicle checks the counterpart, matched vehicle and the gathering location, and moves to the gathering location so as to perform inter-vehicle charging with the counterpart vehicle.

Figure 7:
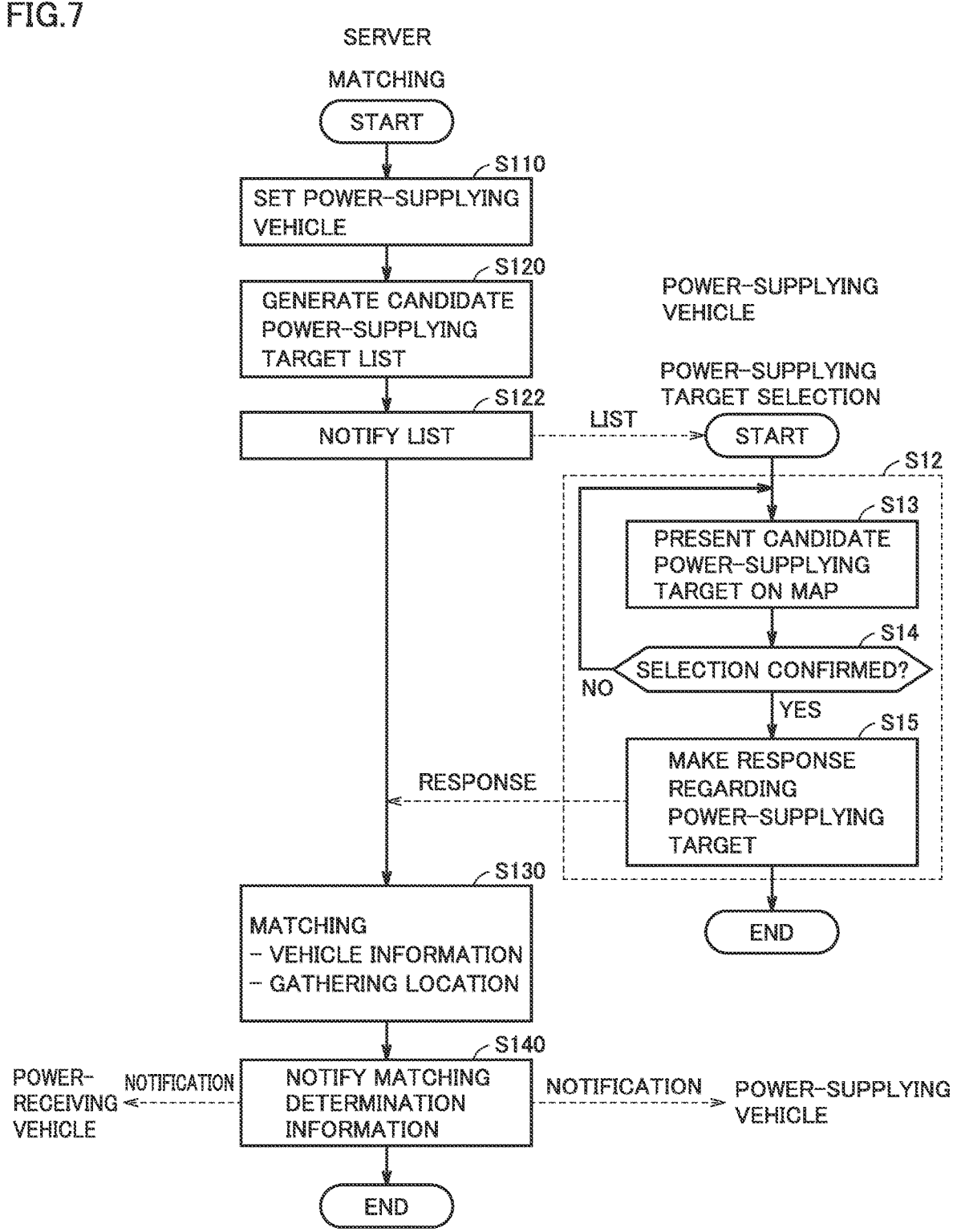
FIG. 7 is a flowchart showing an exemplary detailed procedure of each of a matching process performed by the server and a power-supplying target selection process performed by the power-supplying vehicle.

FIG. 7 is a flowchart showing an exemplary detailed procedure of each of the matching process (step S100 of FIG. 6) performed by server 300 and the power-supplying target selection process (step S12 of FIG. 6) performed by the power-supplying vehicle. In FIG. 7, the process performed by server 300 is shown at the left side and the process performed by the power-supplying vehicle is shown at the right side.

For example, server 300 is triggered to start the process of this flowchart when a predetermined time has passed since the reception of the power-supplying permission information from the power-supplying permitted vehicle.

First, server 300 sets, as the power-supplying vehicle, the power-supplying permitted vehicle specified by the power-supplying permission information (S110).

Next, server 300 generates the above-described "candidate power-supplying target list" indicating candidate power-supplying targets for the power-supplying vehicle (step S120). For example, server 300 first extracts, as candidate power-supplying targets for the power-supplying vehicle, a plurality of power-receiving requesting vehicles existing in a range in which a distance from the power-supplying vehicle is less than a threshold value. Then, server 300 sets a plurality of respective gathering locations corresponding to the plurality of power-receiving requesting vehicles using the location of the power-supplying vehicle and the locations of the plurality of power-receiving requesting vehicles, and generates the "candidate power-supplying target list" including the information of the locations of the plurality of power-receiving requesting vehicles and the plurality of set gathering locations.

FIG. 8 shows an exemplary candidate power-supplying target list generated by server 300. In the example shown in FIG. 8, the candidate power-supplying target list includes information indicating: power-receiving requesting vehicles A to C serving as the candidate power-supplying targets; and gathering locations PPa to PPc for power-receiving requesting vehicles A to C. Further, in the example shown in FIG. 8, the candidate power-supplying target list also includes information such as requested power-receiving amounts Ea to Ec received from power-receiving requesting vehicles A to C and charging times Ta to Tc calculated by server 300 using requested power-receiving amounts Ea to Ec. The following mainly describes a case where server 300 generates the candidate power-supplying target list shown in FIG. 8.

Turning back to FIG. 7, server 300 notifies the generated candidate power-supplying target list to the power-supplying vehicle so as to make an inquiry to the user of the power-supplying vehicle to select one of the candidate power-supplying targets (power-receiving requesting vehicles A to C) included in the candidate power-supplying target list (step S122).

The power-supplying vehicle having received this inquiry from server 300 performs the above-described power-supplying target selection process (step S12).

Specifically, first, the power-supplying vehicle uses the information of the candidate power-supplying target list received from server 300 so as to present the locations of the candidate power-supplying targets on a map screen of display 174 (step S13). On this occasion, when the user performs, onto input interface 172, an operation of selecting one of the candidate power-supplying targets (power-receiving requesting vehicles A to C) presented on the map screen of display 174, the power-supplying vehicle presents, on the map screen of display 174, the gathering location corresponding to the selected candidate power-supplying target.

Figure 9:
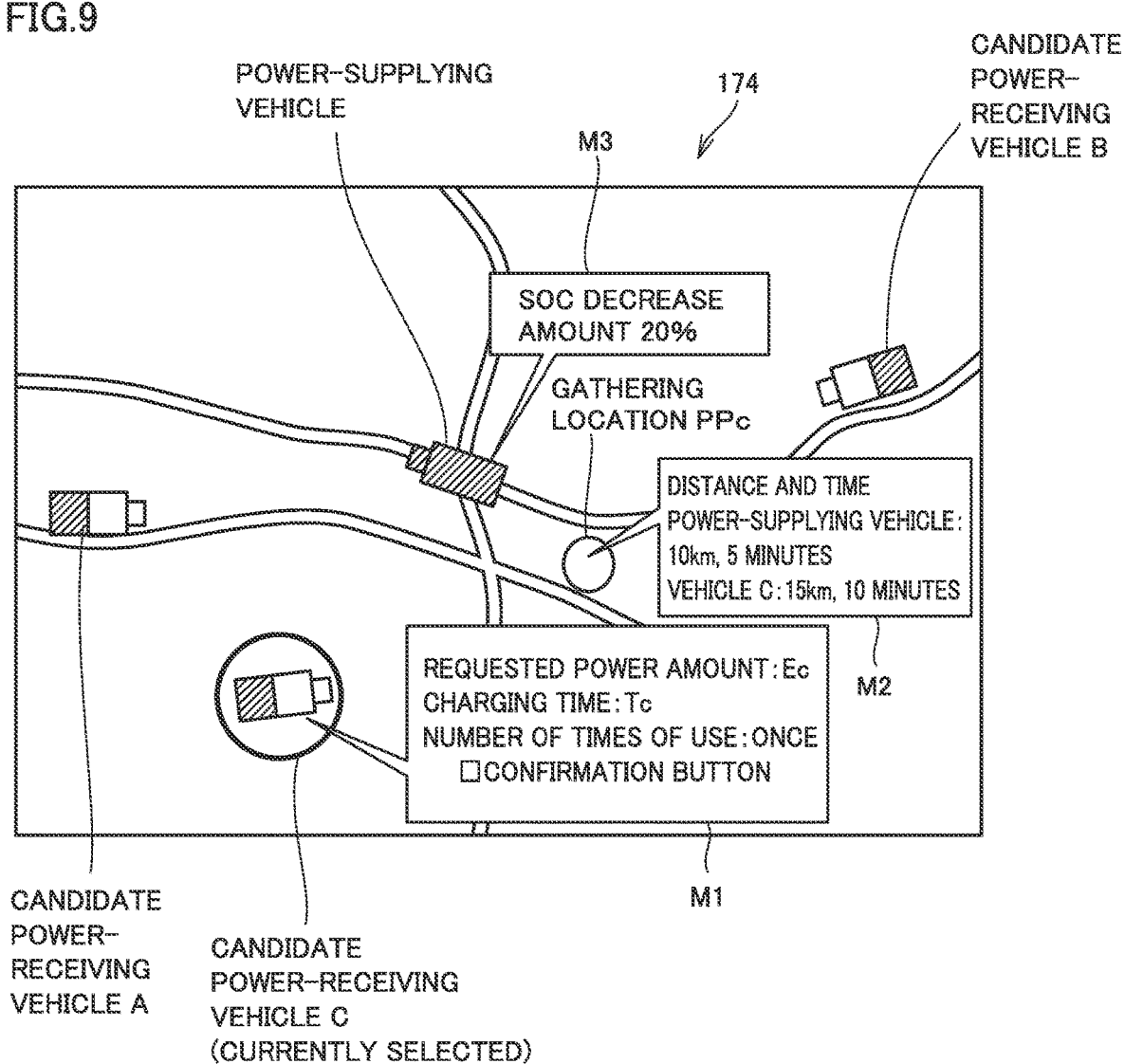
FIG. 9 shows an exemplary screen presented on a display when the power-supplying vehicle performs the power-supplying target selection process.

FIG. 9 shows an exemplary screen presented on display 174 when the power-supplying vehicle performs the power-supplying target selection process. As shown in FIG. 9, the location of the power-supplying vehicle and the locations of power-receiving requesting vehicles A to C (candidate power-supplying targets) are simultaneously presented on the map screen of display 174. With such a presentation, the user of the power-supplying vehicle can intuitively know: what option a power-receiving vehicle to serve as a power-supplying target has; and a relative location relation between the power-supplying vehicle and each candidate power-supplying target.

The user of the power-supplying vehicle can select one of the candidate power-supplying targets through an operation of touching one of power-receiving requesting vehicles A to C presented on the map screen of display 174.

In the example shown in FIG. 9, it is illustrated that the user of the power-supplying vehicle has selected power-receiving requesting vehicle C. In this case, the power-supplying vehicle presents, on the map screen of display 174, gathering location PPc for the currently selected power-receiving requesting vehicle C. Through such a presentation, the user of the power-supplying vehicle can intuitively know the gathering location for the power-supplying target selected by the user.

Further, the power-supplying vehicle presents the following pieces of information on the screen of display 174: message information M1 about power-receiving requesting vehicle C currently selected (requested power-receiving amount Ec, charging time Tc, the number of times of use, and a confirmation button); message information M2 about gathering location PPc (a distance of movement from each vehicle to the gathering location as well as a time for the movement); and message information M3 indicating an amount of decrease in SOC of the power-supplying vehicle due to supply of power to power-receiving requesting vehicle C currently selected. After checking the respective pieces of message information M1 to M3 presented on display 174, the user of the power-supplying vehicle can comprehensively determine whether to confirm the currently selected candidate power-supplying target as the power-supplying target.

The user of the power-supplying vehicle can confirm the currently selected candidate power-supplying target as the power-supplying target through an operation of touching the "confirmation button" presented at message information M1.

Turning back to FIG. 7, the power-supplying vehicle determines whether or not the selection of the power-supplying target by the user is confirmed (step S14). When the selection of the power-supplying target is not confirmed (NO in step S14), the power-supplying vehicle returns the process to step S13 and waits until the selection of the power-supplying target is confirmed.

When the selection of the power-supplying target is confirmed (YES in step S14), the power-supplying vehicle makes a response to server 300 by notifying the selected and confirmed power-supplying target thereto (step S15).

Server 300 having received the response regarding the power-supplying target from the power-supplying vehicle sets, as the power-receiving vehicle, the power-supplying target notified from the power-supplying vehicle and matches the set power-receiving vehicle to the power-supplying vehicle (step S130).

Then, server 300 notifies, to each of the matched vehicles (the power-supplying vehicle and the power-receiving vehicle), the matching determination information including the information of the matched vehicles and the gathering location (step S140).

As described above, server 300 according to the present embodiment generates the candidate power-supplying target list including the information of the plurality of power-receiving requesting vehicles, and notifies it to the power-supplying vehicle so as to make an inquiry to the user of the power-supplying vehicle to select one of the plurality of power-receiving requesting vehicles. Then, server 300 matches the power-receiving vehicle selected by the user of the power-supplying vehicle to the power-supplying vehicle, and transmits a result thereof to the matched vehicles. Accordingly, the user of the power-supplying vehicle can know what option a power-receiving vehicle to serve as a power-supplying target has, and then can select a desired power-supplying target.

Particularly, server 300 according to the present embodiment sets the plurality of respective gathering locations corresponding to the plurality of power-receiving requesting vehicles using the location of the power-supplying vehicle and the location of each power-receiving requesting vehicle, generates the "candidate power-supplying target list" including the information of the locations of the plurality of power-receiving vehicles and the plurality of set gathering locations, and transmits it to the power-supplying vehicle. Accordingly, the user of the power-supplying vehicle can check the location of a power-receiving vehicle to serve as a power-supplying target and the gathering location for the power-receiving vehicle, and then can select a desired power-supplying target.

Further, the power-supplying vehicle according to the present embodiment presents, on the map screen, the locations of the plurality of candidate power-supplying targets included in the candidate power-supplying target list received from server 300. Accordingly, the user of the power-supplying vehicle can intuitively know a relative location relation between the power-supplying vehicle and each candidate power-supplying target. Further, when the user performs an operation of selecting one of the plurality of candidate power-supplying targets presented on the map screen, the power-supplying vehicle presents, on the map screen, the gathering location for the candidate power-supplying target selected by the user. Accordingly, the user of the power-supplying vehicle can intuitively know the gathering location for the power-supplying target selected by the user of the power-supplying vehicle.

Modification 1

In the above-described embodiment, the "candidate power-supplying target list" including the information of the plurality of power-receiving requesting vehicles is generated and is notified to the power-supplying vehicle to allow the user of the power-supplying vehicle to select a power-supplying target.

The relation between the power-supplying vehicle and the power-receiving vehicle may be reversed. Specifically, a "candidate power-supplying source list" including information of a plurality of power-supplying permitted vehicles may be generated and may be notified to a power-receiving vehicle to allow a user of the power-receiving vehicle to select a power-supplying source.

FIG. 10 is a flowchart showing an exemplary detailed procedure of a matching process performed by server 300 and a power-supplying source selection process performed by the power-receiving vehicle, according to a first modification. In FIG. 10, the process performed by server 300 is shown at the left side and the process performed by the power-receiving vehicle is shown at the right side.

It should be noted that a relation between the power-supplying vehicle and the power-receiving vehicle in each of the steps shown in FIG. 10 is obtained by reversing the relation between the power-supplying vehicle and the power-receiving vehicle in each of the steps shown in FIG. 7, and the other matters are the same as those in the steps shown in FIG. 7.

First, server 300 sets, as the power-receiving vehicle, the power-receiving requesting vehicle specified by the power-receiving request information (S110A).

Next, server 300 generates the "candidate power-supplying source list" indicating candidate vehicles to serve as power-supplying sources for the power-receiving vehicle (step S120A). For example, first, server 300 extracts, as the candidate power-supplying sources for the power-receiving vehicle, a plurality of power-supplying permitted vehicles existing in a range in which a distance from the power-receiving vehicle is less than a threshold value. Then, server 300 sets a plurality of respective gathering locations corresponding to the plurality of power-supplying permitted vehicles using the location of the power-receiving vehicle and the locations of the plurality of power-supplying permitted vehicles, and generate the "candidate power-supplying source list" including the information thereof.

Server 300 notifies the generated candidate power-supplying source list to the power-receiving vehicle so as to make an inquiry to the user of the power-receiving vehicle to select one of the candidate power-supplying sources included in the candidate power-supplying source list (step S122A).

The power-receiving vehicle having received this inquiry from server 300 performs a power-supplying source selection process (step S12A). Specifically, first, the power-receiving vehicle uses the information of the candidate power-supplying source list received from server 300 so as to present the locations of the candidate power-supplying sources on a map screen of display 174 (step S13A). On this occasion, when the user performs, onto input interface 172, an operation of selecting one of the candidate power-supplying sources presented on the map screen of display 174, the power-receiving vehicle presents, on the map screen of display 174, the gathering location corresponding to the selected candidate power-supplying target.

When the selection of the power-supplying source by the user is confirmed (YES in step S14A), the power-receiving vehicle makes a response to server 300 by notifying the selected and conformed power-supplying source thereto (step S15A).

Server 300 sets, as the power-supplying vehicle, the power-supplying source notified from the power-receiving vehicle, and matches the set power-supplying vehicle to the power-receiving vehicle (step S130A). Then, server 300 notifies, to each of the matched vehicles, the matching determination information including the information of the matched vehicles and the gathering location (step S140A).

As described above, server 300 may generate the "candidate power-supplying source list" including the information of the plurality of power-supplying permitted vehicles, and may notify it to the power-receiving vehicle to allow the user of the power-receiving vehicle to select a power-supplying source. Accordingly, a service similar to the service provided to the user of the power-supplying vehicle in the above-described embodiment can be provided to the user of the power-receiving vehicle.

Modification 2

In the above-described embodiment, it has been described that one power-supplying vehicle and one power-receiving vehicle are matched through the matching process. However, a combination of the matched vehicles is not limited to this. For example, two or more power-receiving vehicles can be matched to one power-supplying vehicle.

Modification 3

In the above-described embodiment, it has been illustratively described that each vehicle 100 is provided with communication device 180 configured to be communicatively connected to communication network 400 directly (see FIG. 4).

However, the communicative connection between each vehicle 100 and communication network 400 may be made using a mobile terminal held by the user of each vehicle 100. Specifically, each vehicle 100 may be configured to perform short distance communication with a mobile terminal held by the user and configured to be communicatively connected to communication network 400 via the mobile terminal.

Modification 4

In the above-described embodiment, it has been illustratively described that the power-supplying vehicle is an electric vehicle (EV) that travels using electric power. However, the power-supplying vehicle may be a plug-in hybrid vehicle that can travel using electric power as well as fuel (such as gasoline) other than electric power.

Modification 5

In the above-described embodiment, it has been illustratively described that server 300 notifies the information of the matched vehicles and the gathering location to the matched vehicles as the matching determination information.

However, the matching determination information notified by server 300 to the matched vehicles is not limited only to the information described above. For example, in addition to the above-described information, server 300 may transmit, to the matched vehicles, a distance from each vehicle to the gathering location, a time required by each vehicle to move to the gathering location, a gathering time, a power amount that can be supplied by the candidate power-supplying vehicle, a power-receiving amount requested by the candidate power-receiving vehicle, user information of the matched counterpart (such as contact information and the like).

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An information providing system comprising:
    a power-supplying vehicle;
    a plurality of power-receiving vehicles; and
    a server configured to communicate with the power-supplying vehicle and the plurality of power-receiving vehicles,
    the server being configured to
        notify candidate information including information of the plurality of power-receiving vehicles to the power-supplying vehicle so as to make an inquiry to the power-supplying vehicle to select any of the plurality of power-receiving vehicles,
        match the power-supplying vehicle and a power-receiving vehicle selected by the power-supplying vehicle, and transmit, to the power-supplying vehicle and the selected power-receiving vehicle, information indicating that the power-supplying vehicle and the selected power-receiving vehicle are matched, and
        set a plurality of respective gathering locations corresponding to the plurality of power-receiving vehicles using a location of the power-supplying vehicle and locations of the plurality of power-receiving vehicles,
    wherein
        the candidate information includes information of the locations of the plurality of power-receiving vehicles and the plurality of set gathering locations, and
        the power-supplying vehicle includes
            a display configured to present a map screen, and
            a controller configured to control the display, and
    the controller is configured to
        present, on the map screen of the display, the locations of the plurality of power-receiving vehicles included in the candidate information received from the server, and
        present, when a user performs an operation of selecting any of the plurality of power-receiving vehicles presented on the map screen of the display, on the map screen of the display, a gathering location corresponding to the power-receiving vehicle selected by the user.

2. A server comprising a first controller, the first controller being configured to
    communicate with a power-supplying vehicle and a plurality of power-receiving vehicles;
    notify, to the power-supplying vehicle, candidate information including information of the plurality of power-receiving vehicles so as to make an inquiry to the power-supplying vehicle to select any of the plurality of power-receiving vehicles,
    match the power-supplying vehicle and a power-receiving vehicle selected by the power-supplying vehicle and transmit, to the power-supplying vehicle and the selected power-receiving vehicle, information indicating that the power-supplying vehicle and the selected power-receiving vehicle are matched, and
    set a plurality of respective gathering locations corresponding to the plurality of power-receiving vehicles using a location of the power-supplying vehicle and locations of the plurality of power-receiving vehicles, wherein
the candidate information includes information of the locations of the plurality of power-receiving vehicles and the plurality of set gathering locations, and
the power-supplying vehicle includes
a display configured to present a map screen, and
a second controller configured to control the display, and
the second controller is configured to
present, on the map screen of the display, the locations of the plurality of power-receiving vehicles included in the candidate information received from the server, and
present, when a user performs an operation of selecting any of the plurality of power-receiving vehicles presented on the map screen of the display, on the map screen of the display, a gathering location corresponding to the power-receiving vehicle selected by the user.

3. An information providing method performed by an information providing system, wherein the information providing system includes
a power-supplying vehicle,
a plurality of power-receiving vehicles, and
a server configured to communicate with the power-supplying vehicle and the plurality of power-receiving vehicles,
the information providing method comprising:
generating candidate information including information of the plurality of power-receiving vehicles;
notifying the candidate information to the power-supplying vehicle so as to make an inquiry to the power-supplying vehicle to select any of the plurality of power-receiving vehicles;
matching the power-supplying vehicle and a power-receiving vehicle selected by the power-supplying vehicle and transmitting, to the power-supplying vehicle and the selected power-receiving vehicle, information indicating that the power-supplying vehicle and the selected power-receiving vehicle are matched, and
setting a plurality of respective gathering locations corresponding to the plurality of power-receiving vehicles using a location of the power-supplying vehicle and locations of the plurality of power-receiving vehicles,
wherein
the candidate information includes information of the locations of the plurality of power-receiving vehicles and the plurality of set gathering locations, and
the power-supplying vehicle includes
a display configured to present a map screen, and
a controller configured to control the display, and
the controller is configured to
present, on the map screen of the display, the locations of the plurality of power-receiving vehicles included in the candidate information received from the server, and
present, when a user performs an operation of selecting any of the plurality of power-receiving vehicles presented on the map screen of the display, on the map screen of the display, a gathering location corresponding to the power-receiving vehicle selected by the user.

4. An information providing system comprising:
a power-receiving vehicle;
a plurality of power-supplying vehicles; and
a server configured to communicate with the power-receiving vehicle and the plurality of power-supplying vehicles,
the server being configured to
notify, to the power-receiving vehicle, candidate information including information of the plurality of power-supplying vehicles so as to make an inquiry to the power-receiving vehicle to select any of the plurality of power-supplying vehicles,
match the power-receiving vehicle and a power-supplying vehicle selected by the power-receiving vehicle and transmit, to the power-receiving vehicle and the selected power-supplying vehicle, information indicating that the power-receiving vehicle and the selected power-supplying vehicle are matched, and
set a plurality of respective gathering locations corresponding to the plurality of power-supplying vehicles using a location of the power-receiving vehicle and locations of the plurality of power-supplying vehicles,
wherein;
the candidate information includes information of the locations of the plurality of power-supplying vehicles and the plurality of set gathering locations, and
the power-receiving vehicle includes
a display configured to present a map screen, and
a controller configured to control the display, and
the controller is configured to
present, on the map screen of the display, locations of the plurality of power-supplying vehicles included in the candidate information received from the server, and
present, when a user performs an operation of selecting any of the plurality of power-supplying vehicles presented on the map screen of the display, on the map screen of the display, a gathering location corresponding to the power-supplying vehicle selected by the user.

5. A server comprising a first controller, the first controller being configured to
communicate with a power-receiving vehicle and a plurality of power-supplying vehicles; and
notify, to the power-receiving vehicle, candidate information including information of the plurality of power-supplying vehicles so as to make an inquiry to the power-receiving vehicle to select any of the plurality of power-supplying vehicles,
match the power-receiving vehicle and a power-supplying vehicle selected by the power-receiving vehicle and transmit, to the power-receiving vehicle and the selected power-supplying vehicle, information indicating that the power-receiving vehicle and the selected power-supplying vehicle are matched, and
set a plurality of respective gathering locations corresponding to the plurality of power-supplying vehicles using a location of the power-receiving vehicle and locations of the plurality of power-supplying vehicles,
wherein;
the candidate information includes information of the locations of the plurality of power-supplying vehicles and the plurality of set gathering locations, and
the power-receiving vehicle includes
a display configured to present a map screen, and
a second controller configured to control the display, and the second controller is configured to
present, on the map screen of the display, locations of the plurality of power-supplying vehicles included in the candidate information received from the server, and present, when a user performs an operation of selecting any of the plurality of power-supplying vehicles presented on the map screen of the display, on the map screen of the display, a gathering location corresponding to the power-supplying vehicle selected by the user.

6. An information providing method performed by an information providing system, wherein the information providing system includes a power-receiving vehicle, a plurality of power-supplying vehicles, and a server configured to communicate with the power-receiving vehicle and the plurality of power-supplying vehicles, the information providing method comprising:

notifying, to the power-receiving vehicle, candidate information including information of the plurality of power-supplying vehicles so as to make an inquiry to the power-receiving vehicle to select any of the plurality of power-supplying vehicles;

matching the power-receiving vehicle and a power-supplying vehicle selected by the power-receiving vehicle and transmitting, to the power-receiving vehicle and the selected power-supplying vehicle, information indicating that the power-receiving vehicle and the selected power-supplying vehicle are matched, and setting a plurality of respective gathering locations corresponding to the plurality of power-supplying vehicles using a location of the power-receiving vehicle and locations of the plurality of power-supplying vehicles, wherein;

the candidate information includes information of the locations of the plurality of power-supplying vehicles and the plurality of set gathering locations, and the power-receiving vehicle includes a display configured to present a map screen, and a controller configured to control the display, and the controller is configured to present, on the map screen of the display, locations of the plurality of power-supplying vehicles included in the candidate information received from the server, and present, when a user performs an operation of selecting any of the plurality of power-supplying vehicles presented on the map screen of the display, on the map screen of the display, a gathering location corresponding to the power-supplying vehicle selected by the user.

* * * * *